(12) United States Patent
Paulson et al.

(10) Patent No.: US 8,228,234 B2
(45) Date of Patent: Jul. 24, 2012

(54) POWER SAVING SYSTEM AND METHOD FOR MOBILE COMPUTING DEVICE

(75) Inventors: Janell Paulson, Carlsbad, CA (US); Thomas Fong, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 181 days.

(21) Appl. No.: 12/549,249

(22) Filed: Aug. 27, 2009

(65) Prior Publication Data

US 2011/0050503 A1   Mar. 3, 2011

(51) Int. Cl.
*G01S 3/02* (2006.01)
*G01S 19/34* (2010.01)
(52) U.S. Cl. ............ 342/451; 342/357.74; 342/458
(58) Field of Classification Search ............. 342/357.25, 342/357.46, 357.74, 419, 451, 458; 701/213, 701/215
See application file for complete search history.

(56) References Cited

U.S. PATENT DOCUMENTS

| 7,256,731 | B2 | 8/2007 | Siegel et al. |
| 7,460,064 | B1 * | 12/2008 | Tester et al. ............. 342/357.51 |
| 2006/0211430 | A1 | 9/2006 | Persico |
| 2009/0098903 | A1 | 4/2009 | Donaldson et al. |
| 2010/0321321 | A1 * | 12/2010 | Shenfield et al. ............. 345/173 |

FOREIGN PATENT DOCUMENTS

| KR | 10-2006-0096509 A | 9/2006 |
| KR | 10-2008-0078024 A | 8/2008 |

OTHER PUBLICATIONS

PCT Search Report & The Written Opinion of the International Searching Authority: PCT/US2011/053856 ; Feb. 27, 2012.

* cited by examiner

*Primary Examiner* — Dao Phan

(57) ABSTRACT

A mobile computing device includes a housing, a processor provided within the housing, and a location-determining system configured to determine a current location of the mobile computing device at a first rate. The location determining system may be configured to adjust the first rate to a different second rate based on a threshold distance value and a distance from the current location to an anticipated future location of the mobile computing device.

24 Claims, 6 Drawing Sheets

POWER SAVING SYSTEM AND METHOD FOR MOBILE COMPUTING DEVICE

BACKGROUND

Some mobile computing devices provide location-based services to a user. For example, a mobile computing device may use a navigation application to provide directions from the user's current location to a desired destination. A location-determining circuit or system may be used to periodically determine the location of the mobile computing device.

Mobile computing devices may also have wireless transceivers configured to communicate with various types of wireless devices over various types of wireless networks.

SUMMARY

One embodiment relates to a mobile computing device comprising a housing, a processor provided within the housing, and a location-determining system configured to determine a current location of the mobile computing device at a first rate, wherein the location determining system is configured to adjust the first rate to a different second rate based on a threshold distance value and a distance from the current location to an anticipated future location of the mobile computing device.

Another embodiment relates to a mobile computing device comprising a housing, a processor provided within the housing, and a location-determining system coupled to the processor and configured to determine the location of the mobile computing device at each of a plurality of different points in time, wherein adjacent points in time are separated by a period of time, and wherein the location determining system is configured to adjust the period of time based on a current location of the mobile computing device and an anticipated future location of the mobile computing device.

Another embodiment relates to a method comprising determining a current location of a mobile device periodically at a first rate, determining an anticipated future location of the mobile device, and adjusting the first rate based on a threshold distance value and a distance from the current location of the mobile computing device to the anticipated future location of the mobile computing device.

Another embodiment relates to a computer-readable storage medium having stored therein machine-readable instructions for causing, when executed, one or more machines to perform the following method steps: determining a current location of a mobile device periodically at a first rate, determining an anticipated future location of the mobile device, and adjusting the first rate based on a threshold distance value and a distance from the current location of the mobile computing device to the anticipated future location of the mobile computing device.

DETAILED DESCRIPTION

Figure 1:
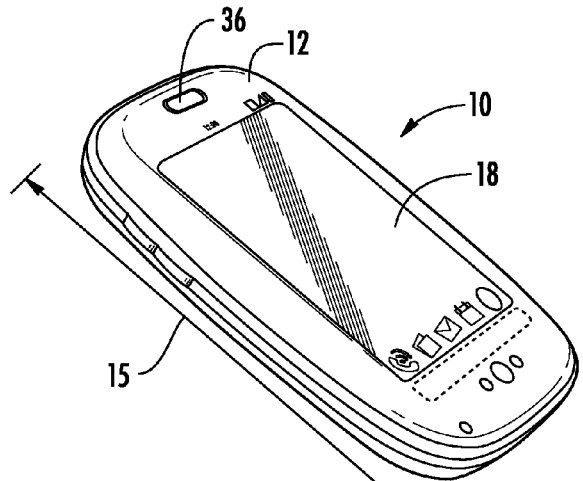
FIG. 1 is a perspective view of a mobile computing device according to an exemplary embodiment.

Some embodiments described herein may reduce the power consumption of a mobile computing device by reducing the activity of location determination circuitry based on one or more factors. Some embodiments described herein may use location-related data such as a current location, a desired or future location, data regarding a particular geographic area (e.g., number of streets, number of intersections, etc.), and so on.

Referring to FIGS. 1-4, a mobile device 10 is shown. The teachings herein can be applied to device 10 or to other electronic devices (e.g., a desktop computer), mobile computing devices (e.g., a laptop computer) or handheld computing devices, such as a personal digital assistant (PDA), smartphone, mobile telephone, personal navigation device, etc. According to one embodiment, device 10 may be a smartphone, which is a combination mobile telephone and handheld computer having PDA functionality. PDA functionality can comprise one or more of personal information management (e.g., including personal data applications such as email, calendar, contacts, etc.), database functions, word processing, spreadsheets, voice memo recording, Global Positioning System (GPS) functionality, etc. Device 10 may be configured to synchronize personal information from these applications with a computer (e.g., a desktop, laptop, server, etc.). Device 10 may be further configured to receive and operate additional applications provided to device 10 after manufacture, e.g., via wired or wireless download, SecureDigital card, etc.

As shown in FIGS. 1-4, device 10 includes a housing 12 and a front 14 and a back 16. Device 10 further comprises a display 18 and a user input device 20 (e.g., a QWERTY keyboard, buttons, touch screen, speech recognition engine, etc.). Display 18 may comprise a touch screen display in order to provide user input to a processor 102 (see FIG. 4) to control functions, such as to select options displayed on display 18, enter text input to device 10, or enter other types of input. Display 18 also provides images (see, e.g., FIG. 5) that are displayed and may be viewed by users of device 10. User input device 20 can provide similar inputs as those of touch screen display 18. An input button 40 may be provided on front 14 and may be configured to perform pre-programmed functions. Device 10 can further comprise a speaker 26, a stylus (not shown) to assist the user in making selections on display 18, a camera 28, a camera flash 32, a microphone 34, and an earpiece 36. Display 18 may comprise a capacitive touch screen, a mutual capacitance touch screen, a self capacitance touch screen, a resistive touch screen, a touch screen using cameras and light such as a surface multi-touch screen, proximity sensors, or other touch screen technologies, and so on. Display 18 may be configured to receive inputs from finger touches at a plurality of locations on display 18 at the same time. Display 18 may be configured to receive a finger swipe or other directional input, which may be interpreted by a processing circuit to control certain functions distinct from a single touch input. Further, a gesture area 30 may be provided adjacent (e.g., below, above, to a side, etc.) or be incorporated into display 18 to receive various gestures as inputs, including taps, swipes, drags, flips, pinches, and so on. One or more indicator areas 38 (e.g., lights, etc.) may be provided to indicate that a gesture has been received from a user.

According to an exemplary embodiment, housing 12 is configured to hold a screen such as display 18 in a fixed relationship above a user input device such as user input device 20 in a substantially parallel or same plane. This fixed relationship excludes a hinged or movable relationship between the screen and the user input device (e.g., a plurality of keys) in the fixed embodiment.

Figure 2:
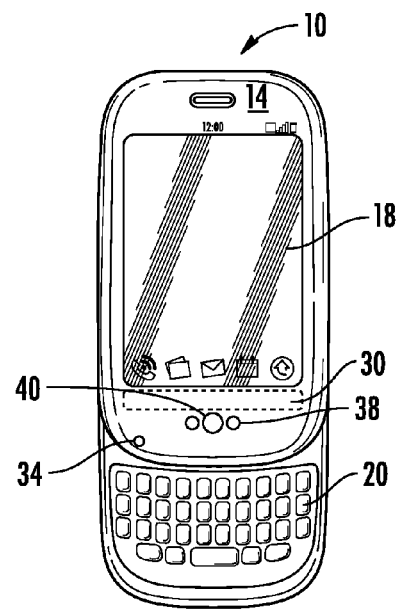
FIG. 2 is a front view of the mobile computing device of FIG. 1 in an extended configuration according to an exemplary embodiment.
Figure 3:
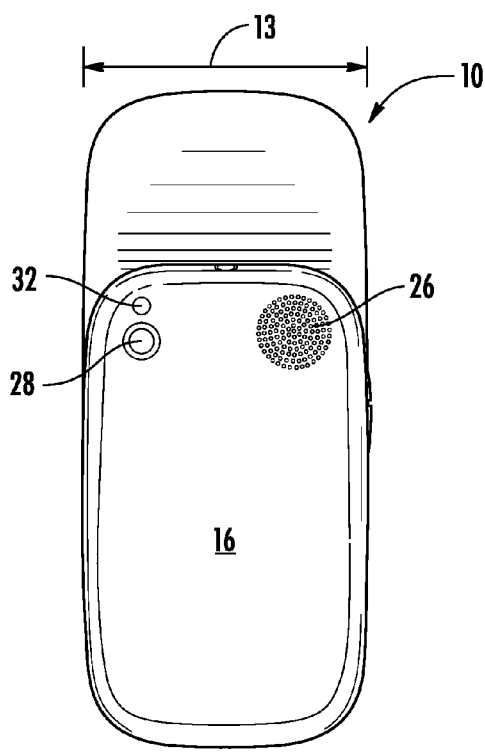
FIG. 3 is a back view of the mobile computing device of FIG. 1 in an extended configuration according to an exemplary embodiment.
Figure 4:
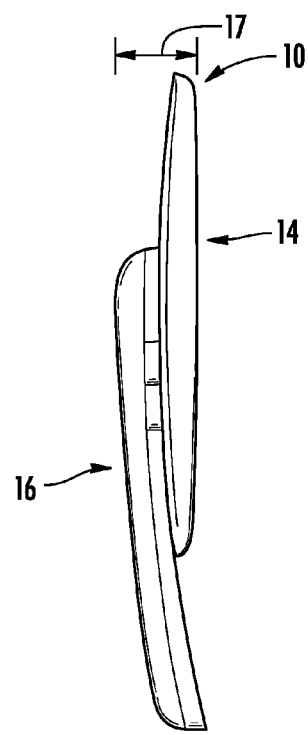
FIG. 4 is a side view of the mobile computing device of FIG. 1 in an extended configuration according to an exemplary embodiment

Device 10 may be a handheld computer, which is a computer small enough to be carried in a hand of a user, comprising such devices as typical mobile telephones and personal digital assistants, but excluding typical laptop computers and tablet PCs. The various input devices and other components of device 10 as described below may be positioned anywhere on device 10 (e.g., the front surface shown in FIG. 2, the rear surface shown in FIG. 3, the side surfaces as shown in FIG. 4, etc.). Furthermore, various components such as a keyboard etc. may be retractable to slide in and out from a portion of device 10 to be revealed along any of the sides of device 10, etc. For example, as shown in FIGS. 2-4, front 14 may be slidably adjustable relative to back 16 to reveal input device 20, such that in a retracted configuration (see FIG. 1) input device 20 is not visible, and in an extended configuration (see FIGS. 2-4) input device 20 is visible.

According to various exemplary embodiments, housing 12 may be any size, shape, and have a variety of length, width, thickness, and volume dimensions. For example, width 13 may be no more than about 200 millimeters (mm), 100 mm, 85 mm, or 65 mm, or alternatively, at least about 30 mm, 50 mm, or 55 mm. Length 15 may be no more than about 200 mm, 150 mm, 135 mm, or 125 mm, or alternatively, at least about 70 mm or 100 mm. Thickness 17 may be no more than about 150 mm, 50 mm, 25 mm, or 15 mm, or alternatively, at least about 10 mm, 15 mm, or 50 mm. The volume of housing 12 may be no more than about 2500 cubic centimeters (cc) or 1500 cc, or alternatively, at least about 1000 cc or 600 cc.

Device 10 may provide voice communications functionality in accordance with different types of cellular radiotelephone systems. Examples of cellular radiotelephone systems may include Code Division Multiple Access (CDMA) cellular radiotelephone communication systems, Global System for Mobile Communications (GSM) cellular radiotelephone systems, etc.

In addition to voice communications functionality, device 10 may be configured to provide data communications functionality in accordance with different types of cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Long Term Evolution (LTE) systems, etc.

Device 10 may be configured to provide voice and/or data communications functionality in accordance with different types of wireless network systems. Examples of wireless network systems may further include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

Device 10 may be configured to perform data communications in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth.

Figure 5:
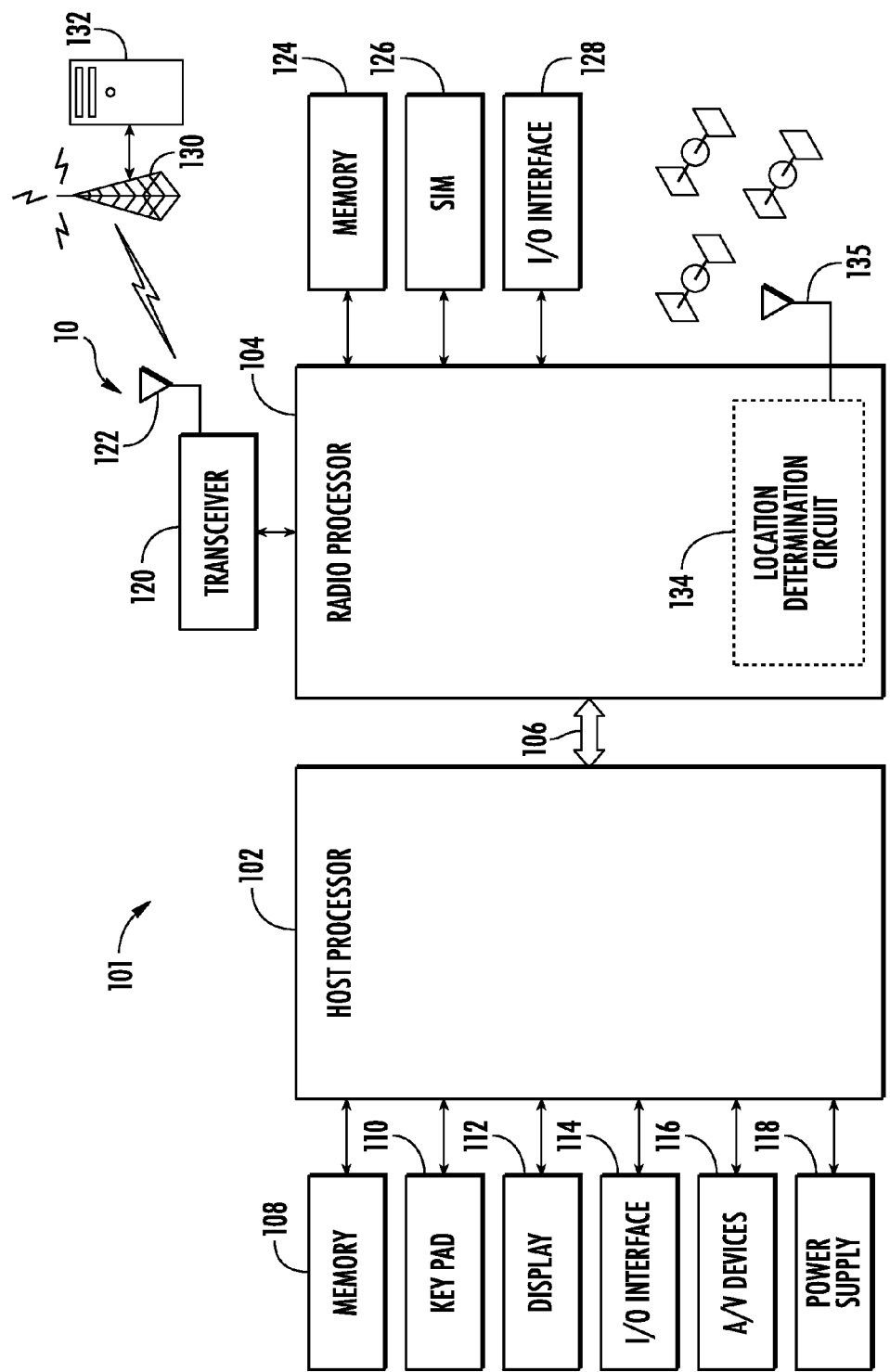
FIG. 5 is a block diagram of the mobile computing device of FIG. 1 according to an exemplary embodiment.

As shown in the embodiment of FIG. 5, device 10 may comprise a dual processor architecture including a host processor 102 and a radio processor 104 (e.g., a base band processor). The host processor 102 and the radio processor 104 may be configured to communicate with each other using interfaces 106 such as one or more universal serial bus (USB) interfaces, micro-USB interfaces, universal asynchronous receiver-transmitter (UART) interfaces, general purpose input/output (GPIO) interfaces, control/status lines, control/data lines, shared memory, and so forth.

The host processor 102 may be responsible for executing various software programs such as application programs and system programs to provide computing and processing operations for device 10. The radio processor 104 may be responsible for performing various voice and data communications operations for device 10 such as transmitting and receiving voice and data information over one or more wireless communications channels. Although embodiments of the dual processor architecture may be described as comprising the host processor 102 and the radio processor 104 for purposes of illustration, the dual processor architecture of device 10 may comprise additional processors, may be implemented as a dual- or multi-core chip with both host processor 102 and radio processor 104 on a single chip, etc.

In various embodiments, the host processor 102 may be implemented as a host central processing unit (CPU) using any suitable processor or logic device, such as a general purpose processor. The host processor 102 may comprise, or be implemented as, a chip multiprocessor (CMP), dedicated processor, embedded processor, media processor, input/output (I/O) processor, co-processor, a field programmable gate array (FPGA), a programmable logic device (PLD), or other processing device in alternative embodiments. In an exemplary embodiment, host processor 102 is an OMAP2, such as an OMAP2431 processor, manufactured by Texas Instruments, Inc.

The host processor 102 may be configured to provide processing or computing resources to device 10. For example, the host processor 102 may be responsible for executing various software programs such as application programs and system programs to provide computing and processing operations for device 10. Examples of application programs may include, for example, a telephone application, voicemail application, e-mail application, instant message (IM) application, short message service (SMS) application, multimedia message service (MMS) application, web browser application, personal information manager (PIM) application, contact management application, calendar application, scheduling application, task management application, word processing application, spreadsheet application, database application, video player application, audio player application, multimedia player application, digital camera application, video camera application, media management application, a gaming application, and so forth. The application software may provide a graphical user interface (GUI) to communicate information between device 10 and a user.

System programs assist in the running of a computer system. System programs may be directly responsible for controlling, integrating, and managing the individual hardware components of the computer system. Examples of system programs may include, for example, an operating system (OS), device drivers, programming tools, utility programs, software libraries, an application programming interface (API), graphical user interface (GUI), and so forth. Device 10 may utilize any suitable OS in accordance with the described embodiments such as a Palm OS®, Palm OS® Cobalt, Microsoft® Windows OS, Microsoft Windows® CE, Microsoft Pocket PC, Microsoft Mobile, Symbian OS™, Embedix OS, Linux, Binary Run-time Environment for Wireless (BREW) OS, JavaOS, a Wireless Application Protocol (WAP) OS, and so forth.

Device 10 may comprise a memory 108 coupled to the host processor 102. In various embodiments, the memory 108 may be configured to store one or more software programs to be executed by the host processor 102. The memory 108 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), or any other type of media suitable for storing information.

Although the memory 108 may be shown as being separate from the host processor 102 for purposes of illustration, in various embodiments some portion or the entire memory 108 may be included on the same integrated circuit as the host processor 102. Alternatively, some portion or the entire memory 108 may be disposed on an integrated circuit or other medium (e.g., hard disk drive) external to the integrated circuit of host processor 102. In various embodiments, device 10 may comprise an expansion slot to support a multimedia and/or memory card, for example.

Device 10 may comprise a user input device 110 coupled to the host processor 102. The user input device 110 may comprise, for example, a QWERTY key layout and an integrated number dial pad. Device 10 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, a keypad, an alphanumeric keypad, and so forth.

The host processor 102 may be coupled to a display 112. The display 112 may comprise any suitable visual interface for displaying content to a user of device 10. For example, the display 112 may be implemented by a liquid crystal display (LCD) such as a touch-sensitive color (e.g., 16-bit color) thin-film transistor (TFT) LCD screen. In some embodiments, the touch-sensitive LCD may be used with a stylus and/or a handwriting recognizer program.

Device 10 may comprise an input/output (I/O) interface 114 coupled to the host processor 102. The I/O interface 114 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a local personal computer (PC). In various implementations, device 10 may be configured to transfer and/or synchronize information with the local computer system.

The host processor 102 may be coupled to various audio/video (A/V) devices 116 that support A/V capability of device 10. Examples of A/V devices 116 may include, for example, a microphone, one or more speakers, an audio port to connect an audio headset, an audio coder/decoder (codec), an audio player, a digital camera, a video camera, a video codec, a video player, and so forth.

The host processor 102 may be coupled to a power supply 118 configured to supply and manage power to the elements of device 10. In various embodiments, the power supply 118 may be implemented by a rechargeable battery, such as a removable and rechargeable lithium ion battery to provide direct current (DC) power, and/or an alternating current (AC) adapter to draw power from a standard AC main power supply.

As mentioned above, the radio processor 104 may perform voice and/or data communication operations for device 10. For example, the radio processor 104 may be configured to communicate voice information and/or data information over one or more assigned frequency bands of a wireless communication channel. In various embodiments, the radio processor 104 may be implemented as a communications processor using any suitable processor or logic device, such as a modem processor or base band processor. Although some embodiments may be described with the radio processor 104 implemented as a modem processor or base band processor by way of example, it may be appreciated that the embodiments are not limited in this context. For example, the radio processor 104 may comprise, or be implemented as, a digital signal processor (DSP), media access control (MAC) processor, or any other type of communications processor in accordance with the described embodiments. Radio processor 104 may be any of a plurality of modems manufactured by Qualcomm, Inc. or other manufacturers.

In various embodiments, the radio processor 104 may perform analog and/or digital base band operations for device 10. For example, the radio processor 104 may perform digital-to-analog conversion (DAC), analog-to-digital conversion (ADC), modulation, demodulation, encoding, decoding, encryption, decryption, and so forth.

Device 10 may comprise a transceiver module 120 coupled to the radio processor 104. The transceiver module 120 may comprise one or more transceivers configured to communicate using different types of protocols, communication ranges, operating power requirements, RF sub-bands, information types (e.g., voice or data), use scenarios, applications, and so forth. In various embodiments, the transceiver module 120 may comprise one or more transceivers configured to support voice communication for a cellular radiotelephone system such as a GSM, UMTS, CDMA, and/or LTE system. The transceiver module 120 also may comprise one or more transceivers configured to perform data communications in accordance with one or more wireless communications protocols such as WWAN protocols (e.g., GSM/GPRS protocols, CDMA/1xRTT protocols, EDGE protocols, EV-DO protocols, EV-DV protocols, HSDPA protocols, etc.), WLAN protocols (e.g., IEEE 802.11a/b/g/n, IEEE 802.16, IEEE 802.20, etc.), PAN protocols, Infrared protocols, Bluetooth protocols, EMI protocols including passive or active RFID protocols, and so forth.

The transceiver module 120 may be implemented using one or more chips as desired for a given implementation. Although the transceiver module 120 may be shown as being separate from and external to the radio processor 104 for purposes of illustration, in various embodiments some portion or the entire transceiver module 120 may be included on the same integrated circuit as the radio processor 104.

Device 10 may comprise an antenna system 122 for transmitting and/or receiving electrical signals. As shown, the antenna system 122 may be coupled to the radio processor 104 through the transceiver module 120. The antenna system 122 may comprise or be implemented as one or more internal antennas and/or external antennas.

Device 10 may comprise a memory 124 coupled to the radio processor 104. The memory 124 may be implemented using one or more types of machine-readable or computer-readable media capable of storing data such as volatile memory or non-volatile memory, removable or non-removable memory, erasable or non-erasable memory, writeable or re-writeable memory, etc. The memory 124 may comprise, for example, flash memory and secure digital (SD) RAM. Although the memory 124 may be shown as being separate from and external to the radio processor 104 for purposes of illustration, in various embodiments some portion or the entire memory 124 may be included on the same integrated circuit as the radio processor 104.

Device 10 may comprise a subscriber identity module (SIM) 126 coupled to the radio processor 104. The SIM 126 may comprise, for example, a removable or non-removable smart card configured to encrypt voice and data transmissions and to store user-specific data for allowing a voice or data communications network to identify and authenticate the user. The SIM 126 also may store data such as personal settings specific to the user.

Device 10 may comprise an I/O interface 128 coupled to the radio processor 104. The I/O interface 128 may comprise one or more I/O devices to enable wired (e.g., serial, cable, etc.) and/or wireless (e.g., WiFi, short range, etc.) communication between device 10 and one or more external computer systems.

In various embodiments, device 10 may comprise location or position determination capabilities. Device 10 may employ one or more location determination techniques including, for example, Global Positioning System (GPS) techniques, Cell Global Identity (CGI) techniques, CGI including timing advance (TA) techniques, Enhanced Forward Link Trilateration (EFLT) techniques, Time Difference of Arrival (TDOA) techniques, Angle of Arrival (AOA) techniques, Advanced Forward Link Trilateration (AFLT) techniques, Observed Time Difference of Arrival (OTDOA), Enhanced Observed Time Difference (EOTD) techniques, Assisted GPS (AGPS) techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), etc.

Device 10 may be configured to operate in one or more location determination modes including, for example, a standalone mode, a mobile station (MS) assisted mode, and/or a MS-based mode. In a standalone mode, such as a standalone GPS mode, device 10 may be configured to determine its position without receiving wireless navigation data from the network, though it may receive certain types of position assist data, such as almanac, ephemeris, and coarse data. In a standalone mode, device 10 may comprise a local location determination circuit 134 (e.g., a GPS receiver) which may be integrated within housing 12 (FIG. 1) configured to receive satellite data via an antenna 135 and to calculate a position fix. Local location determination circuit may alternatively comprise a GPS receiver in a second housing separate from housing 12 but in the vicinity of device 10 and configured to communicate with device 10 wirelessly (e.g., via a PAN, such as Bluetooth). When operating in an MS-assisted mode or an MS-based mode, however, device 10 may be configured to communicate over a radio access network 130 (e.g., UMTS radio access network) with a remote computer 132 (e.g., a location determination entity (PDE), a location proxy server (LPS) and/or a mobile positioning center (MPC), etc.).

In an MS-assisted mode, such as an MS-assisted AGPS mode, the remote computer 132 may be configured to determine the position of the mobile computing device and provide wireless data comprising a position fix. In an MS-based mode, such as an MS-based AGPS mode, device 10 may be configured to determine its position using acquisition data or other wireless data from the remote computer 132. The acquisition data may be provided periodically. In various implementations, device 10 and the remote computer 132 may be configured to communicate according to a suitable MS-PDE protocol (e.g., MS-LPS or MS-MPC protocol) such as the TIA/EIA standard IS-801 message protocol for MS-assisted and MS-based sessions in a CDMA radiotelephone system.

When assisting the mobile computing device 10, the remote computer 132 may handle various processing operations and also may provide information to aid location determination. Examples of position assist data may include satellite-based measurements, terrestrial-based measurements, and/or system-based measurements such as satellite almanac information, GPS code phase measurements, ionospheric data, ephemeris data, time correction information, altitude estimates, timing offsets, forward/reverse link calibration, coarse data, and so forth.

In various implementations, the position assist data provided by the remote computer 132 may improve the speed of satellite acquisition and the probability of a position fix by concentrating the search for a GPS signal and/or may improve the accuracy of location determination. Each position fix or series of position fixes may be available at device 10 and/or at the remote computer 132 depending on the location determination mode. In some cases, data calls may be made and position assist data may be sent to device 10 from the remote computer 132 for every position fix (e.g., in an ad hoc mode). In other cases, data calls may be made and position assist data may be sent periodically and/or as needed.

In various embodiments, device 10 may comprise dedicated hardware circuits or structures, or a combination of dedicated hardware and associated software, to support location determination. For example, the transceiver module 120 and the antenna system 122 may comprise GPS receiver or transceiver hardware and one or more associated antennas coupled to the radio processor 104 to support location determination.

The host processor 102 may comprise and/or implement at least one LBS (location-based service) application. In general, the LBS application may comprise any type of client application executed by the host processor 102, such as a GPS application, configured to communicate location requests (e.g., requests for position fixes) and location responses. Examples of LBS applications include, without limitation, wireless 911 emergency services, roadside assistance, asset tracking, fleet management, friends and family locator services, dating services, and navigation services which may provide the user with maps, directions, routing, traffic updates, mass transit schedules, information regarding local points-of-interest (POI) such as restaurants, hotels, landmarks, and entertainment venues, and other types of LBS services in accordance with the described embodiments.

The LBS application may be configured to send a location request in response to receiving input from device 10 or from a source external to device 10. For example, the user of device 10 may interact with a data input device to command the LBS application to send a location request. The LBS application also may send a location request in response to receiving input from an external network element or computing device that is attempting to locate the user of device 10. In some cases, the LBS application also may be configured to automatically, periodically, and/or autonomously send location requests.

Although other applications may operate without regard to the location of device 10, in various embodiments, the LBS application may request and receive position information to enhance the functionality of one or more of the other applications. For example, position information may be provided in conjunction with a messaging application to locate the sender or recipient of a message. Position information may be provided to a web browser application to generate directions to a location associated with a particular website. Positioning information may be provided to a personal management application to generate location-based alerts and/or directions to a meeting place.

The radio processor 104 may be configured to receive location requests from an LBS API handler on host processor 102 and may forward location responses to the LBS API handler for delivery to the LBS application through the LBS API. Radio processor 104 may be configured to communicate securely over a network with remote computer 132 (e.g., PDE, LPS or MPC) configured to provide authentication and authorization services and/or a variety of geo-services. For example, radio processor 104 may be configured to communicate with a PDE configured to verify privacy for location requests, allow authorized access to a location server, and provide various location server services. Radio processor 104 also may be configured to communicate with a PDE to request and receive geo-service information. Examples of geo-service information may include mapping information, routing information, geo-coding and reverse geo-coding information for addresses and coordinates, POI information, and so forth.

Radio processor 104 may be configured to invoke a position fix by configuring a position engine and requesting a position fix. For example, a position engine interface on radio processor 104 may set configuration parameters that control the location determination process. Examples of configuration parameters may include, without limitation, location determination mode (e.g., standalone, MS-assisted, MS-based), actual or estimated number of position fixes (e.g., single position fix, series of position fixes, request position assist data without a position fix), time interval between position fixes, Quality of Service (QoS) values, optimization parameters (e.g., optimized for speed, accuracy, or payload), PDE address (e.g., IP address and port number of LPS or MPC), etc.

Radio processor 104 also may set request/response parameters to request and return various types of position information. Examples of request/response parameters may include current location, latitude, longitude, altitude, heading, vector information such as horizontal and vertical velocity, sector-based position location, position fix method, level of accuracy, time offset, position uncertainty, device orientation, client initialization and registration, and so forth.

The radio processor 104 may comprise or implement a position engine such as a GPS engine. In various embodiments, the position engine may be configured to provide location determination capabilities for device 10. In some embodiments, the position engine may be implemented as software operating in conjunction with hardware (e.g., GPS receiver hardware) allowing device 10 to receive and process GPS satellites signals for location determination. In one embodiment, the position engine may be implemented as a QUALCOMM® gpsOne® engine.

In various implementations, the position engine may employ one or more location determination techniques such as GPS, CGI, CGI+TA, EFLT, TDOA, AOA, AFLT, OTDOA, EOTD, AGPS, GPS/AGPS, hybrid techniques, and so forth. The position engine also may be configured to operate in one or more location determination modes including a standalone mode, an MS-assisted mode, and an MS-based mode. The determined position information generated and/or obtained by the position engine generally may comprise any type of information associated with the location of device 10. Examples of position information may include, without limitation, current location, latitude, longitude, altitude, heading information, vector information such as horizontal and vertical velocity, sector-based position location, position fix information, position uncertainty, device orientation, and so forth.

In various embodiments, device 10 may be used in connection with a variety of applications that require determination of the location of device 10. For example, various navigation and mapping applications may be utilized to provide various types of data and information to users, including driving directions, map information, point of interest (POI) information, and so on. A location determining circuit or system such as location determining circuit 134 (see FIG. 5) may periodically determine (e.g., obtain, request or determine a position fix, update a location, etc.) the location of device 10 at a standard rate or period (e.g., every second, twice per second, etc.) on a continuous, ongoing basis. Utilizing a location determining system in such a manner, however, typically requires significant power. Should a device rely on a power source such as a battery (e.g., as in the case with typical mobile phones, smart phones, and other mobile devices), the available usage time of the device may be significantly decreased because of the power requirements of the location determining system.

Referring to FIGS. 6-9, according to various embodiments, device 10 may be configured to adjust (e.g., increase, decrease, etc.) the rate or period at which the location of device 10 is updated (e.g., the rate at which position fixes are obtained or updated) based on various factors. These factors may include, among others, a distance to be traveled prior to reaching a turn (e.g., a significant change in direction, etc.) or a point of interest (e.g., a restaurant, gas station, tourist shop, etc.), the street density of an area (e.g., the total length of street in an area, etc.), the number of intersections in a predetermined area, the number of points of interest in a predetermined area, and so forth. Many other factors may be taken into account in determining whether to modify the rate at which location determining system 134 updates the location of device 10 according to various alternative embodiments.

Figure 6:
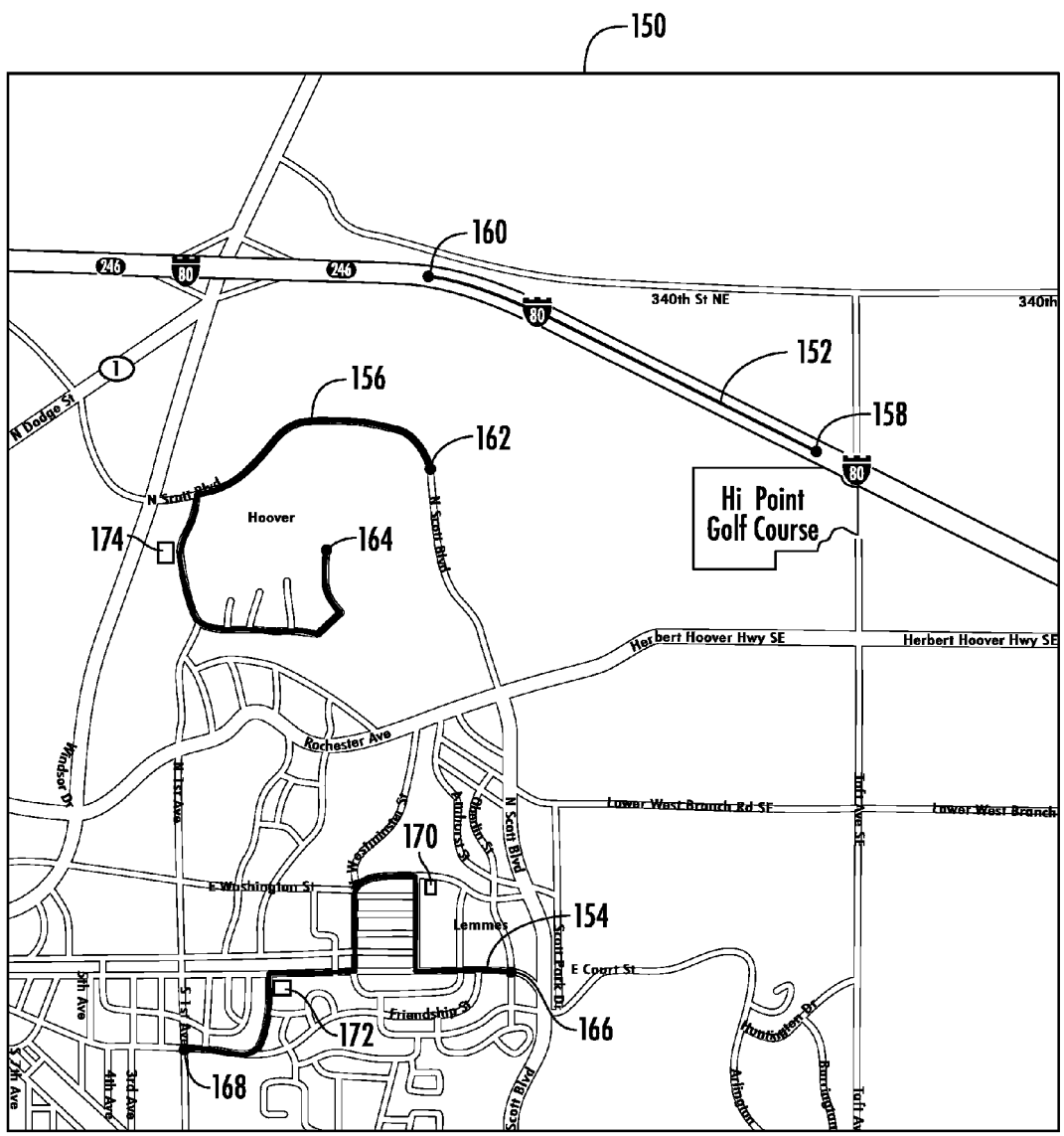
FIG. 6 is a display of a mobile computing device showing an image of navigation data according to an exemplary embodiment.

For example, a user of device 10 may be traveling along one of routes 152, 154, 156 shown in FIG. 6. Routes 152, 154, 156 may be provided (e.g., calculated, determined, etc.) in a variety ways, including through the use of a navigation or mapping application running on or in communication with device 10. Route 152 includes a current location 158 of device 10 and an anticipated future destination 160 (e.g., an expected future location, a destination point, etc.) for device 10. The anticipated future destination may be calculated or determined by a route calculation algorithm using input data from a user (e.g., current location and/or destination) and a geographic element data from a geographic information database. Alternatively, the anticipated future destination(s) may be input by a user (e.g., waypoints, points of interest, etc.). The expected or anticipated future destination may be anticipated or expected by a user of device 10, an application on device 10, or another entity. Route 154 includes a current location 166 of device 10 and an anticipated destination 168 for device 10. Route 156 includes a current location 162 of device 10 and an anticipated destination 164 of device 10. Further, points of interest 170, 172 or other significant points may be located along a route of travel, and may include turns, cross-streets, restaurants, hotels, gas stations, tourist destinations, and so on.

As shown in FIG. 6, routes 152, 154, 156 may travel through different types of geographic areas, and may include varying numbers of stops, turns, and so on. For example, route 154 is provided in an area with a relatively high street density (e.g., the total length of street in a predetermined area, the number of streets that cross the path of route 154, etc.) and includes a number of turns between various streets through the area. Further, points of interest 170, 172 may be adjacent to portions of route 154. Route 154 may be typical of a route through, for example, an urban area with a relatively dense arrangement of streets, intersections, points of interest, and so on. Accordingly, a user utilizing a navigation or other system in connection with location determining system 134 may wish to maintain the rate at which the location of device 10 is updated at a standard (e.g., a default, a maximum, a user-defined, etc.) rate while traveling along route 154. In one embodiment, the standard rate may be once per second. In other embodiments, a slower or faster standard rate may be utilized. In some embodiments, the user may wish to increase the standard rate while in areas such as route 154.

Referring further to FIG. 6, route 156 may be provided in a geographic area with a lower street density and fewer intersections than route 154. Further, there may be only a single point of interest 174 adjacent route 156. Thus, it may not be necessary to update the location of device 10 at the standard rate over certain portions of route 156, as the user may be traveling along a route without any turns, intersections, points of interest, etc. Device 10 may be configured to reduce the rate at which the location of device 10 is updated along at least portions of route 156 in order to reduce the power consumed by location determining system 134. For example, a second, reduced rate may be once per 30 seconds, less than once per second, less than once per 10 seconds, less than once per 20 seconds, etc., although any reduced rate may be used, and the reduced rate may be determined in a variety of ways.

Referring further to FIG. 6, route 152 may be provided in a geographic area having a street density that is lower than that of both routes 154 and 156. Further there may be no intersections or points of interest along route 152 (as determined by a route-generating algorithm in response to user inputs). Accordingly, device 10 may be configured to reduce the rate at which the location of device 10 is updated to a rate (e.g., less than once per minute, less than once per two minutes, etc.) lower than that used with one or both of routes 154 and 156 in order to provide even further power savings, as there may be a relatively lower risk that a user will require position updates at the relatively higher rates utilized in connection with routes 154, 156.

Figure 7:
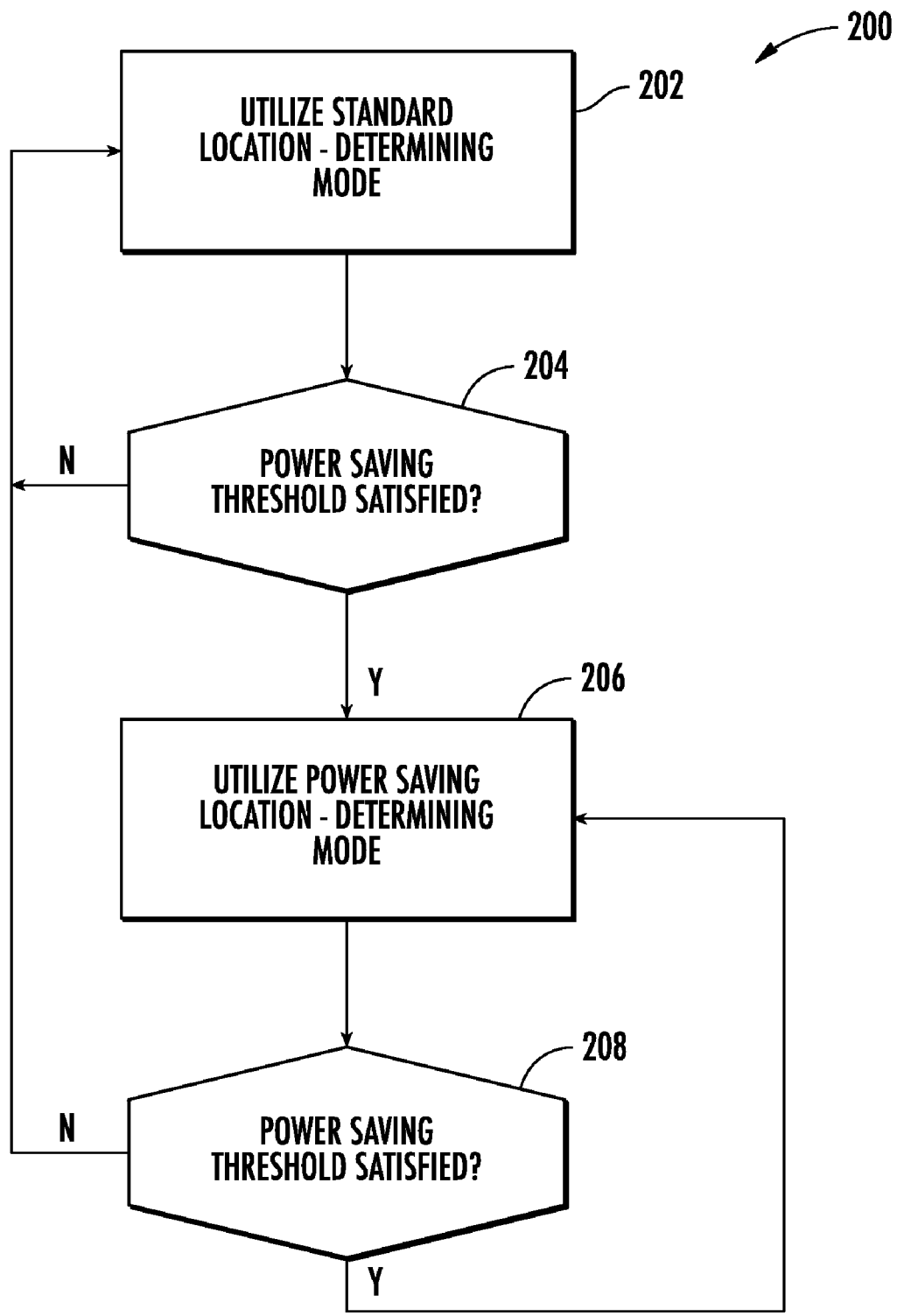
FIG. 7 is a flowchart of a method of using a mobile computing device according to an exemplary embodiment.

Referring now to FIG. 7, a flow chart 200 of a method that may be implemented using device 10 according to one embodiment is shown, and, that may be utilized to manage power consumption of a mobile device utilizing a system such as location determining system 134. First, location determining system 134 determines the location of device 10 utilizing a standard, or default update rate or mode, such as once per second (step 202). Next, device 10 determines whether one or more thresholds (e.g., a "power-saving" threshold such as a distance to the next turn or point of interest, a maximum street density or number of intersections within a predetermined area, a current vehicle velocity, etc.) has been satisfied (step 204). If the one or more thresholds is satisfied, then device 10 and location determining system 134 may enter a power savings mode where location determining system 134 utilizes a power saving mode such that the rate at which location determining system 134 updates the location of device 10 is reduced (step 206). If the thresholds are not satisfied, device 10 and location determining system 134 continue to update the location of device 10 at the standard rate (return to step 202). While in the power savings mode (step 206) device 10 and location determining system 134 may continue to monitor one or more threshold values (step 208) to determine whether to remain in a power savings mode (step 206) or return the device to the standard location determining mode where the location of device 10 is updated at the standard rate (step 202). Upon returning to the standard mode, device 10 may continue to monitor whether the power saving thresholds are satisfied in order to determine whether to again enter the power savings mode.

According to various exemplary embodiments, device 10 may consider a number of factors in determining whether one or more power savings thresholds have been met (steps 204 and/or 208 in FIG. 7). For example, one factor may be whether the distance from the current location of device 10 to a second location exceeds a threshold distance value. The second location may represent a turn off of a current street or highway, etc., a point of interest, a planned intermediate stop along a route, a destination or end point along a route, etc. Another factor may be whether the "street density" (e.g., the number of streets, the total length of street, the number of intersections, etc.) of a geographic area within a certain distance of a route or a portion of a route is less than a density threshold. Other factors may also be considered in various alternative embodiments, including the number of points of interest within a given area, whether a user has traveled a given route in the past, the speed of a user, the expected travel time to a second location, the types of points of interest in a given area, the history of a user in visiting or looking up points of interest (e.g., a user frequently looks up pizza restaurants, etc.), etc.

As an example of the operation of the method shown in FIG. 7, a user traveling along route 152 (FIG. 6) may utilize a device such as device 10. While at point 158, device 10 may determine its location (e.g., a current location), route 152, and determine that it is 20 miles to planned destination 160 (e.g., a future location or destination). Device 10 may utilize a threshold value of 5 miles, such that device 10 determines that 20 miles exceeds the distance threshold value of 5 miles and enters a power savings mode at point 158. Device 10 may then update its position at a reduced rate to conserve power (e.g., the update rate may be reduced from once every second to once every 30 seconds). After each location update, device 10 may determine the distance from device 10 to point 160, and upon coming within 5 miles of point 160, device 10 returns to the standard mode of updating the location of device 10 (e.g., once per second). Device 10 may monitor other parameters while in a power saving mode, including street density, whether a time period has expired (e.g., based on a user's speed), and so on.

Figure 8:
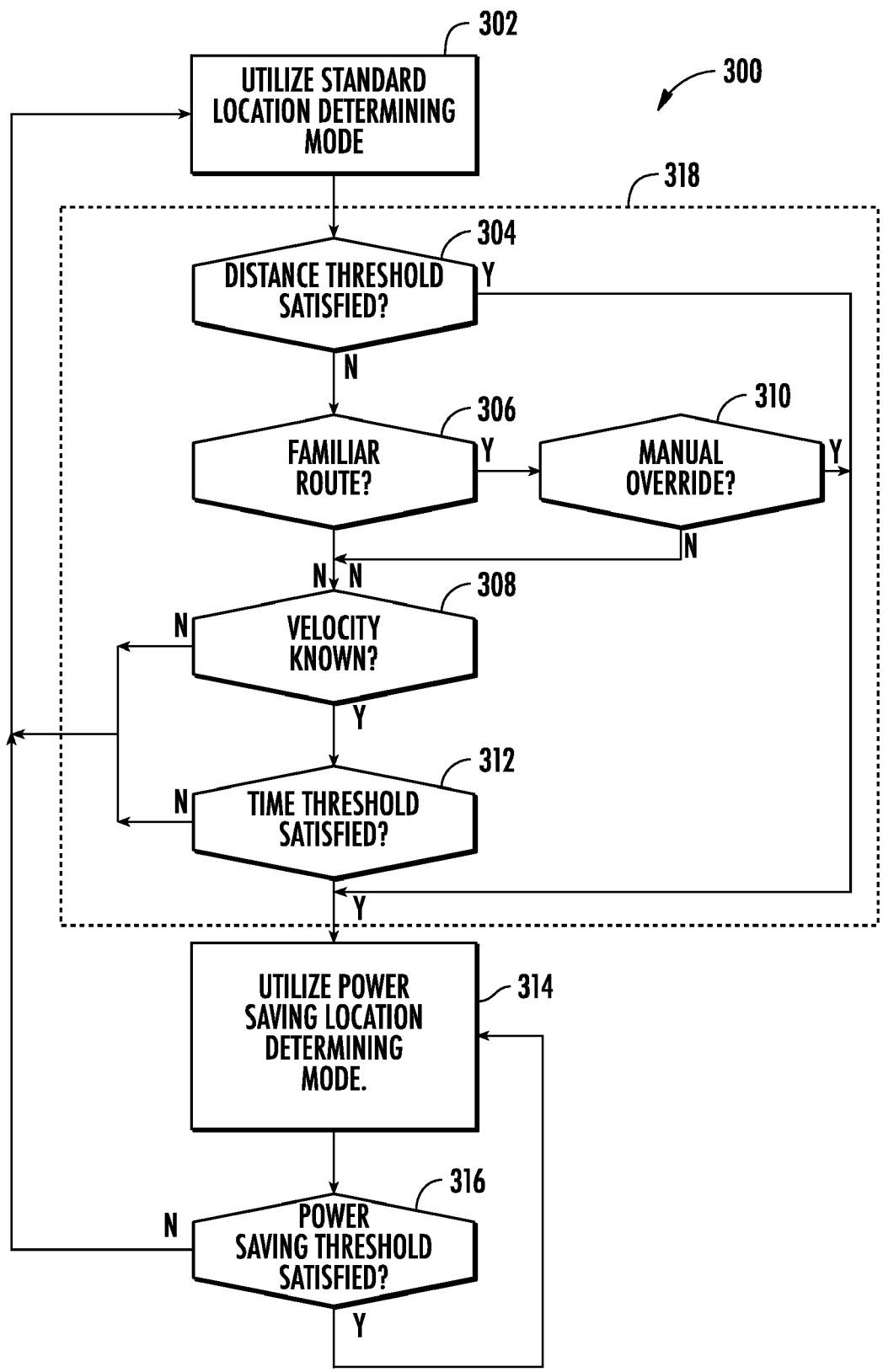
FIG. 8 is a flowchart of a method of using a mobile computing device according to another exemplary embodiment.

Referring now to FIG. 8, a flow chart 300 of a method that may be implemented using device 10 according to another embodiment is illustrated and may be utilized to manage power consumption of a mobile device utilizing a position system such as location determining system 134. Flow chart 300 is similar to flow chart 200 shown in FIG. 7 except that flow chart 300 provides a step 318 that generally corresponds to an expanded version of step 204 shown in FIG. 7. As shown in FIG. 8, location determining system 134 may determine the location of device 10 utilizing a standard, or default update rate or mode, such as once per second (step 302). Next, device 10 determines whether to enter a power savings mode (step 318).

As part of step 318, device 10 may first determine whether a distance threshold is satisfied (step 304). In one embodiment, determining whether a distance threshold is satisfied includes determining whether the distance from a current location of device 10 to a second location is greater than a threshold distance value. As discussed above, the second location may represent a destination location, a point of interest, a turn along a route, etc. The threshold distance value may be any distance (e.g., 1 mile, 10 miles, etc.) and may further take into account a current rate of travel of device 10 (e.g., such that the threshold distance value is increased/decreased as the speed of travel of device 10 increases/decreases). If the distance threshold is satisfied, device 10 enters power savings mode (step 314).

If the distance threshold is not satisfied, device 10 then determines whether a user is likely to be familiar with a particular area or route (step 306). In some embodiments, determining whether a user is familiar with an area or route includes analyzing past travel patterns of device 10 to determine that all or a part of the current route or nearby streets had been previously-travelled by device 10. In other embodiments, other factors may be considered, including proximity to a user's home, place of work, etc. If device 10 determines that a user is likely to be familiar with a particular area or route, then device 10 may provide the user with a "manual override" feature, such as providing a prompt to a user asking whether the user would like to utilize a power saving mode on device 10 for at least a portion of a particular route (e.g., "Entering power savings mode, is this OK?"). If the user wishes to utilize the power savings mode, device 10 enters power savings mode (step 314). The "manual override" or manual approval feature may be used in any of the embodiments disclosed herein.

If device 10 determines that the user is likely not familiar with a particular route or area, device 10 proceeds to determine whether the speed of device 10 is known (step 308), such that device 10 may compute an estimated amount of time it will take for device 10 to reach a particular point such as a point of interest or destination. If the estimated time satisfies a time value threshold (e.g., 5 minutes, 10 minutes, 30 minutes, etc.) (step 312), device 10 may enter a power saving mode (step 314). If the estimated time does not satisfy a time value threshold, or the speed of device 10 is not known, device 10 remains in a standard mode of updating the location of device 10 (return to step 302).

If device 10 enters a power saving mode (step 314), device 10 may continue to monitor various threshold parameters (step 316) to determine when device 10 should be returned to a standard operating mode (return to step 302). In some embodiments, monitoring the various thresholds includes evaluating one or more of the factors considered as part of step 318 (including one or more of steps 304-312). Alternatively, different or additional factors may be considered in determining whether to maintain device 10 in a power savings mode, including monitoring the expiration of a time period, monitoring street density, and so on.

Figure 9:
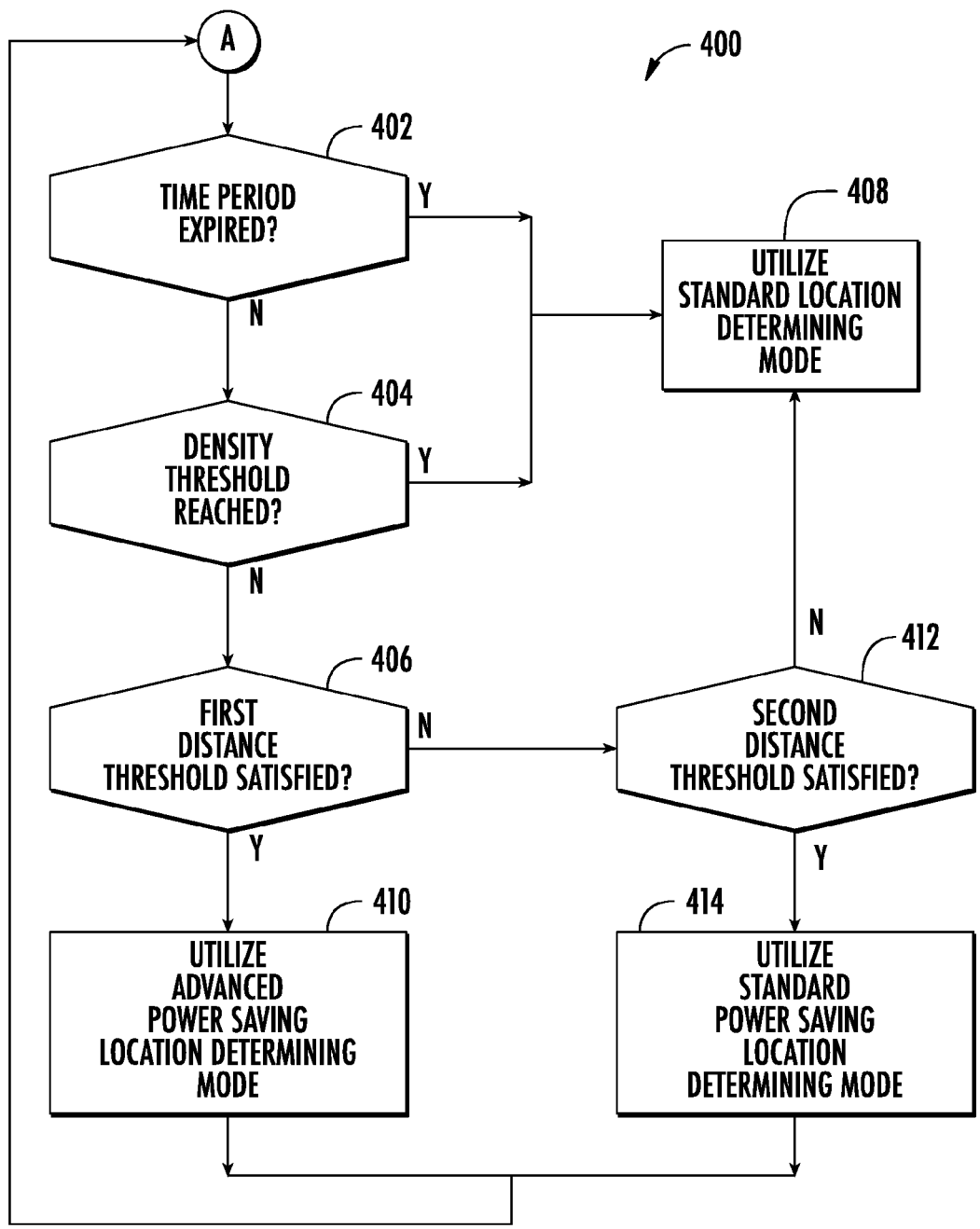
FIG. 9 is a flowchart of a method of using a mobile computing device according to another exemplary embodiment.

In another embodiment, device 10 may be configured to consider a plurality of different threshold parameters along with a weighting or other multiplier to weight each threshold individually, wherein the sum of the weighted thresholds determines whether to enter the power saving mode. Referring now to FIG. 9, a flow chart 400 of a method for managing power consumption of a mobile device utilizing a position system such as location determining system 134 is shown according to an exemplary embodiment. The embodiment shown in FIG. 9 assumes that at point (A) in flow chart 400 a device such as device 10 is already operating in a power saving mode (e.g., see step 314 shown in FIG. 8). Generally, flow chart 400 provides a method for device 10 to determine whether to (i) return to a standard mode (e.g., using a standard update rate for determining the position of device 10), (ii) remain in a power saving mode (e.g., using a reduced update rate for determining the position of device 10), or (iii) utilize an "advanced" power saving mode, where the update rate for determining the position of device 10 may be reduced even further based on one or more factors, or other power saving techniques may be implemented by device 10, such as reducing the power consumption of a display, reducing the frequency of audio and/or visual prompts (e.g., automated direction prompts), and so forth.

First, device 10 may determine whether any predetermined time limits have been reached (step 402) and whether a density threshold has been exceeded (step 404). Such time and/or density thresholds may be determined and/or evaluated in a manner similar to that discussed with respect to FIG. 8. If a time limit has been reached or a density threshold exceeded, device 10 returns to a standard mode (step 408). Otherwise, device 10 then determines whether a first distance threshold value is satisfied (step 406). If the first distance threshold value is satisfied, device 10 enters an advanced power saving mode (step 410). If the first distance threshold is not satisfied, device 10 determines whether a lesser, second distance threshold is satisfied (step 412). If the second distance threshold is satisfied, device 10 remains in power savings mode. If the second threshold is not satisfied, device 10 returns to a standard mode (step 408).

According to an exemplary embodiment, the first distance threshold value (used in step 406) is greater than the second distance threshold value, so that, for example, if a device is a significant distance away from a second location (e.g., a turn, point of interest, etc.), an advanced power savings mode may be used. As the distance from device 10 to the second location decreases, device 10 will change to the power savings mode (e.g., when the second, but not the first, distance threshold values are satisfied), and eventually return to the standard mode (e.g., when neither the first nor the second distance threshold values are satisfied).

According to one embodiment, providing "advanced" power savings includes taking steps in addition to reducing the rate at which the location of device 10 is updated. For example, this may include turning portions of a display off, reducing the number of audio and/or visual prompts that may be provided by a navigation application, reducing the update rate further (relative to the non-advanced power saving mode), and so on. Other power-saving steps may be implemented according to various other embodiments. Any of the power savings modes may further include shutting down certain activities performed by device 10, such as tracking satellites, downloading position-assist data, and so on.

According to any of the embodiments disclosed herein, location determining system 134 may be configured to obtain or determine the location of device 10 in response to a variety of user inputs or other activities. For example, a user may be in a power savings mode and also be browsing the web. The user may provide an input while browsing that triggers location determining system 134, including various searches for restaurants (e.g., a location-based search), points of interest, etc. Further, certain inputs may cause a display such as a display screen to "wake up" from a "sleep" (e.g., reduced power) mode. In some embodiments, location determining system 134 may be configured to determine the position of device 10 while a display screen or other feature remains in a "sleep" mode. In further embodiments, a user may be provided with the option to "opt-in" or "opt-out" of utilizing various power saving features by providing inputs to device 10.

In some embodiments, a method may include periodically determining a location of a mobile computing device at a first rate, determining a street density of a geographic area associated with the location of the mobile computing device, and adjusting the first rate based on comparing the street density of the geographic area with a threshold density value. The method may further include reducing the first rate to a slower second rate upon determining that the street density is less than the threshold density value. The street density may be based on at least one of the length of street in the geographic area, the number of intersections in the geographic area, and the number of streets intersecting a route of the mobile computing device. Further, the second rate upon determining that the street density is greater than or equal to the threshold density value.

Various embodiments disclosed herein may include or be implemented in connection with computer-readable media configured to store machine-executable instructions therein, and/or one or more modules, circuits, units, or other elements that may comprise analog and/or digital circuit components configured or arranged to perform one or more of the steps recited herein. By way of example, computer-readable media may include RAM, ROM, CD-ROM, or other optical disk storage, magnetic disk storage, or any other medium capable of storing and providing access to desired machine-executable instructions.

While the detailed drawings, specific examples and particular formulations given describe exemplary embodiments, they serve the purpose of illustration only. The hardware and software configurations shown and described may differ depending on the chosen performance characteristics and physical characteristics of the computing devices. The systems shown and described are not limited to the precise details and conditions disclosed. Furthermore, other substitutions, modifications, changes, and omissions may be made in the design, operating conditions, and arrangement of the exemplary embodiments without departing from the scope of the present disclosure as expressed in the appended claims.

What is claimed is:

1. A mobile computing device comprising:
   a housing;
   a processor provided within the housing; and
   a location-determining system configured to determine a current location of the mobile computing device at a first rate, wherein the location determining system is configured to adjust the first rate to a different second rate based on a threshold distance value and a distance from the current location to an anticipated future location of the mobile computing device, wherein the location determining system is configured to adjust the first rate to the different second rate when the distance from the current location to the future location exceeds a threshold distance value, wherein the second rate is slower than the first rate, and the location determining system is configured to monitor a street density along a route traveled by the mobile computing device and adjust the second rate back to the first rate upon determining that a street density of a geographic area exceeds a threshold density value;
   wherein power consumption associated with the first rate is different than power consumption associated with the second rate.

2. The mobile computing device of claim 1, wherein the location determining system is configured to adjust the second rate back to the first rate upon determining that the current location is less than or equal to the threshold distance value.

3. The mobile computing device of claim 1, wherein the location determining system is configured to adjust the second rate back to the first rate after a period of time, the period of time being determined based on the distance from the current location to the future location.

4. The mobile computing device of claim 1, wherein the threshold distance value is a first distance value, and the location determining system is configured to adjust the second rate back to the first rate upon determining that the distance from the current location to the future location is less than or equal to a second distance value, the second distance value being less than the first distance value.

5. The mobile computing device of claim 1, wherein the threshold distance value is a first threshold distance value, and wherein the location determining system is configured to instruct the processor to utilize additional power savings features upon determining that the distance from the current location to the future location is greater than a second threshold distance value, the second threshold distance value being greater then the first threshold distance value.

6. The mobile computing device of claim 5, wherein the additional power savings features include at least one of
   a reduction of the second rate to a slower third rate;
   a reduction of power supplied to a display screen; and
   a reduction in the frequency of voice or display prompts generated by the mobile computing device.

7. The mobile computing device of claim 1, wherein the location determining system is configured to adjust the first rate to the second rate based further on the familiarity of a user of the mobile computing device with a driving route between the current location and the future location, the familiarity of the user being based on stored historic travel data associated with the mobile computing device.

8. The mobile computing device of claim 7, wherein the location determining system is configured to adjust the first rate to the second rate based further on a speed of the mobile computing device.

9. The mobile computing device of claim 1, wherein the location determining system is configured to receive an input from a user indicating that the user wishes the location determining system to adjust the first rate to the second rate, the second rate being slower than the first rate.

10. The mobile computing device of claim 1, wherein the location determining system comprises a Global Positioning System.

11. A mobile computing device comprising:
    a housing;
    a processor provided within the housing; and
    a location-determining system coupled to the processor and configured to determine the location of the mobile computing device at each of a plurality of different points in time, wherein adjacent points in time are separated by a period of time, and wherein the location determining system is configured to adjust the period of time based on a current location of the mobile computing device, an anticipated future location of the mobile computing device, and a street density along a route traveled by the mobile computing device;

wherein adjustment of the period of time causes a change in power consumption by the mobile computing device.

12. The mobile computing device of claim 11, wherein the location determining system is further configured to identify the future location by determining that at least one of a speed and a direction of the mobile computing device is expected to remain substantially constant while the mobile computing device travels between the current location and the future location.

13. The mobile computing device of claim 12, wherein the future location is one of a plurality of locations provided along a driving route calculated by a navigation application running on the mobile computing device.

14. The mobile computing device of claim 11, wherein the location determining system is configured to increase the period of time based on determining that a distance between the current location and the future location exceeds a threshold distance value.

15. The mobile computing device of claim 14, wherein the location determining system is configured to increase the period of time in an amount determined based on the distance between the current location and the future location.

16. A method comprising:

determining a current location of a mobile device periodically at a first rate;

determining an anticipated future location of the mobile device; and adjusting the first rate based on a threshold distance value, a distance from the current location of the mobile computing device to the anticipated future location of the mobile computing device, and a street density along a route traveled by the mobile computing device;

wherein adjusting the first rate causes a change in power consumption by the mobile computing device.

17. The method of claim 16, further comprising decreasing the first rate in response to determining that the distance from the current location to the future location exceeds the threshold distance value.

18. The method of claim 17, further comprising determining whether a user is familiar with a route between the current location and the future location and adjusting the first rate based on the level of familiarity.

19. The method of claim 18, further comprising prompting a user for an input indicating whether the user wishes to adjust the first rate.

20. The method of claim 18, further comprising adjusting the first rate based further on a speed of the mobile computing device and a time threshold determined based on the speed of the mobile computing device.

21. A computer-readable storage medium having stored therein machine-readable instructions for causing, when executed, one or more machines to perform the following method steps:

determining a current location of a mobile device periodically at a first rate;

determining an anticipated future location of the mobile device; and adjusting the first rate based on a threshold distance value, a distance from the current location of the mobile computing device to the anticipated future location of the mobile computing device, and a street density along a route traveled by the mobile computing device;

wherein adjusting the first rate causes a change in power consumption by the mobile computing device.

22. The computer-readable storage medium of claim 21, further comprising decreasing the first rate in response to determining that the distance from the current location to the future location exceeds the threshold distance value.

23. The computer-readable storage medium of claim 21, further comprising determining whether a user is familiar with a route between the current location and the future location and adjusting the first rate based on the level of familiarity.

24. The computer-readable storage medium of claim 21, further comprising prompting a user for an input indicating whether the user wishes to adjust the first rate.

* * * * *